US010733279B2

(12) United States Patent
Andalo et al.

(10) Patent No.: US 10,733,279 B2
(45) Date of Patent: Aug. 4, 2020

(54) MULTIPLE-TIERED FACIAL RECOGNITION

(71) Applicant: Motorola Mobility LLC, Chicago, IL (US)

(72) Inventors: Fernanda Alcantara Andalo, Campinas (BR); Rafael Soares Padilha, Sao Paulo (BR); Waldir Rodrigues de Almeida, Campinas (BR); Gabriel Capiteli Bertocco, Campinas (BR); Jacques Wainer, Campinas (BR); Ricardo da Silva Torres, Campinas (BR); Anderson de Rezende Rocha, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 241 days.

(21) Appl. No.: 15/918,462

(22) Filed: Mar. 12, 2018

(65) Prior Publication Data
US 2019/0278894 A1    Sep. 12, 2019

(51) Int. Cl.
*G06F 21/00* (2013.01)
*G06F 21/32* (2013.01)
*G06N 3/04* (2006.01)
*G06N 3/08* (2006.01)
*G06F 17/18* (2006.01)
(52) U.S. Cl.
CPC .............. *G06F 21/32* (2013.01); *G06F 17/18* (2013.01); *G06N 3/04* (2013.01); *G06N 3/08* (2013.01)

(58) Field of Classification Search
CPC ........... G06F 17/18; G06F 21/32; G06N 3/04; G06N 3/08
See application file for complete search history.

(56) References Cited

U.S. PATENT DOCUMENTS

2010/0316265 A1\* 12/2010 Nakanowatari ......... G06F 21/32
382/118
2012/0070041 A1\* 3/2012 Wang ...................... G06F 21/32
382/118

(Continued)

OTHER PUBLICATIONS

Kuo and Lee, "A Two-Stage Classifier Using SVM and RANSAC for Face Recognition," 1-4244-1272-2/07, 2007 IEEE.

(Continued)

*Primary Examiner* — Tri M Tran
(74) *Attorney, Agent, or Firm* — Amerson Law Firm, PLLC

(57) ABSTRACT

A method includes receiving probe image data associated with a biometric authentication request on a mobile device. A first classifier is employed to generate a first probability metric of the probe image data being associated with the authorized user. The biometric authentication request is approved responsive to the first probability metric being greater than a first threshold. The biometric authentication request is denied responsive to the first probability metric being less than a second threshold. Responsive to the probability metric being between the first and second thresholds, a second classifier is employed to generate a second probability metric of the probe image data being associated with the authorized user. The biometric authentication request is approved responsive to the second probability metric being greater than a third threshold.

20 Claims, 5 Drawing Sheets

(56) References Cited

U.S. PATENT DOCUMENTS

2017/0351929 A1* 12/2017 Kim .................. G09G 5/10
2018/0276465 A1* 9/2018 Lee .................. G06K 9/00892

OTHER PUBLICATIONS

Soyata et al., "Cloud-Vision: Real-time Face Recognition Using a Mobile-Cloudlet-Cloud Acceleration Architecture," 978-1-4673-2713-8/12, 2012 IEEE.

Xi et al., "Mobile device access control: an improved correlation based face authentication scheme and its Java ME application," Concurrently and Computation: Practice and Experience, 24:1066-85, 2012.

* cited by examiner

MULTIPLE-TIERED FACIAL RECOGNITION

BACKGROUND

Field of the Disclosure

The disclosed subject matter relates generally to biometric identity verification and, more particularly, to a multiple-tiered facial recognition approach.

Description of the Related Art

The popularity and affordability of mobile devices have greatly increased in recent years. As a consequence of their ubiquity, these devices now carry personal data that should be accessed only by their owners. Knowledge-based security procedures, such as keywords, passwords, secret questions, etc., or token-based procedures (e.g., smart cards) are the main methods employed to verify the owner's identity. Such techniques might be ineffective as they can be easily shared, lost, stolen or manipulated.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art, by referencing the accompanying drawings.

The use of the same reference symbols in different drawings indicates similar or identical items.

DETAILED DESCRIPTION OF EMBODIMENT(S)

FIGS. 1-5 illustrate example techniques for performing a multiple-tiered facial recognition technique.

Figure 1:
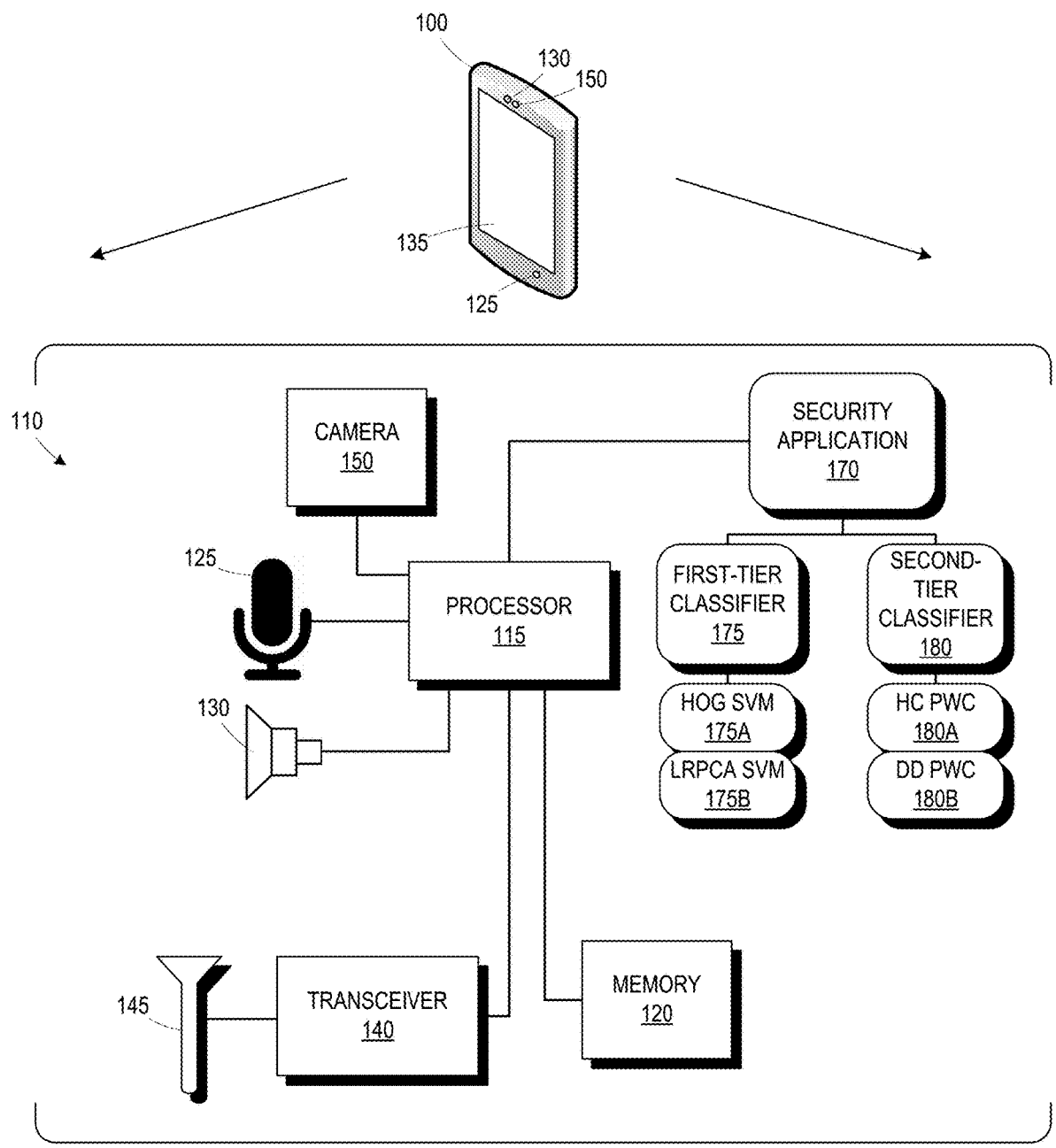
FIG. 1 is a simplified block diagram of a device for performing a multiple-tiered facial recognition technique, according to some embodiments.

FIG. 1 is a simplistic diagram of a device 100 for performing a multiple-tiered facial recognition technique, according to some embodiments. The device 100 implements a computing system 110 including, among other things, a processor 115, a memory 120, a microphone 125, a speaker 130, a display 135, a transceiver 140, an antenna 145 and a camera 150. The memory 120 may be a volatile memory (e.g., DRAM, SRAM) or a non-volatile memory (e.g., ROM, flash memory, etc.), or a combination thereof. The transceiver 140 transmits and receives signals via the antenna 145. The transceiver 140 may include one or more radios for communicating according to different radio access technologies, such as cellular, Wi-Fi, Bluetooth®, ZigBee, etc. In various embodiments, the device 100 may be embodied in handheld or wearable devices, such as laptop computers, handheld computers, tablet computers, mobile devices, telephones, personal data assistants, music players, game devices, wearable computing devices, cameras and the like.

In the device 100, the processor 115 may execute instructions stored in the memory 120 and store information in the memory 120, such as the results of the executed instructions. Some embodiments of the processor 115, the memory 120 and the camera 150 may be configured to implement a security application 170 and perform portions of the classifiers and the method 500 shown in FIGS. 2-5 and discussed below.

As shown in FIG. 1, the security application 170 employs a first-tier classifier 175 and a second-tier classifier 180. Each classifier 175, 180 may have different components or sub-tiers. In some embodiments, the first-tier classifier 175 is a user-specific classifier, and the second-tier classifier employs one or more pairwise classifiers. Detailed descriptions of the classifiers 175, 180 are provided with reference to FIGS. 2-4, and a diagram illustrating a method 500 for employing the classifiers 175, 180 is described in reference to FIG. 5.

The security application 170 first operates in an enrollment mode to learn the identity of the user. During enrollment, the user utilizes the camera 150 to acquire a set of self-portrait pictures, referred to as a gallery. The security application 170 then detects the face in each image, normalizes them, and extracts and stores a set of features for each face. During an authentication mode, the security application 170 captures a current image of the individual seeking to authenticate using the camera 150, referred to as a probe image, detects the face in the probe image, normalizes it, extracts the corresponding features of the face and employs the classifiers 175, 180 to authenticate the individual.

The feature data may include hand-crafted features designed using domain knowledge of the data to create representations of face images in a process called description or feature engineering. General techniques for characterizing the features of a face include geometrical features (angles and distances), textures, appearance over the regions around fiducial points, etc. In the illustrated embodiment, the security application 170 employs Histogram of Oriented Gradients (HOG) and Local Region Principal Component Analysis (LRPCA) features. Specific techniques for implementing these feature sets are known in the art and are not described in detail herein.

In general, HOG evaluates normalized local histograms of image gradient orientations in a dense grid. The image is divided into small cells, and, for each cell, a local histogram of gradient directions over the pixels is accumulated. The combined histograms are used to represent a face image. To improve invariance, a measure of local histogram energy is accumulated over larger spatial regions (blocks), and the results are used to normalize all cells in the block.

LRPCA calculates a low dimensional projection space through PCA for the whole face and 13 local regions within it, centered relative to the average location of the eyes, eyebrows, nose and mouth. During training, the PCA subspaces are constructed for each region, retaining only part of the eigenvectors. Whereas, in authentication, a face image has its regions extracted and projected to the respective PCA subspace. The outputs of each region are concatenated to form the final LRPCA feature vector.

Figure 2:
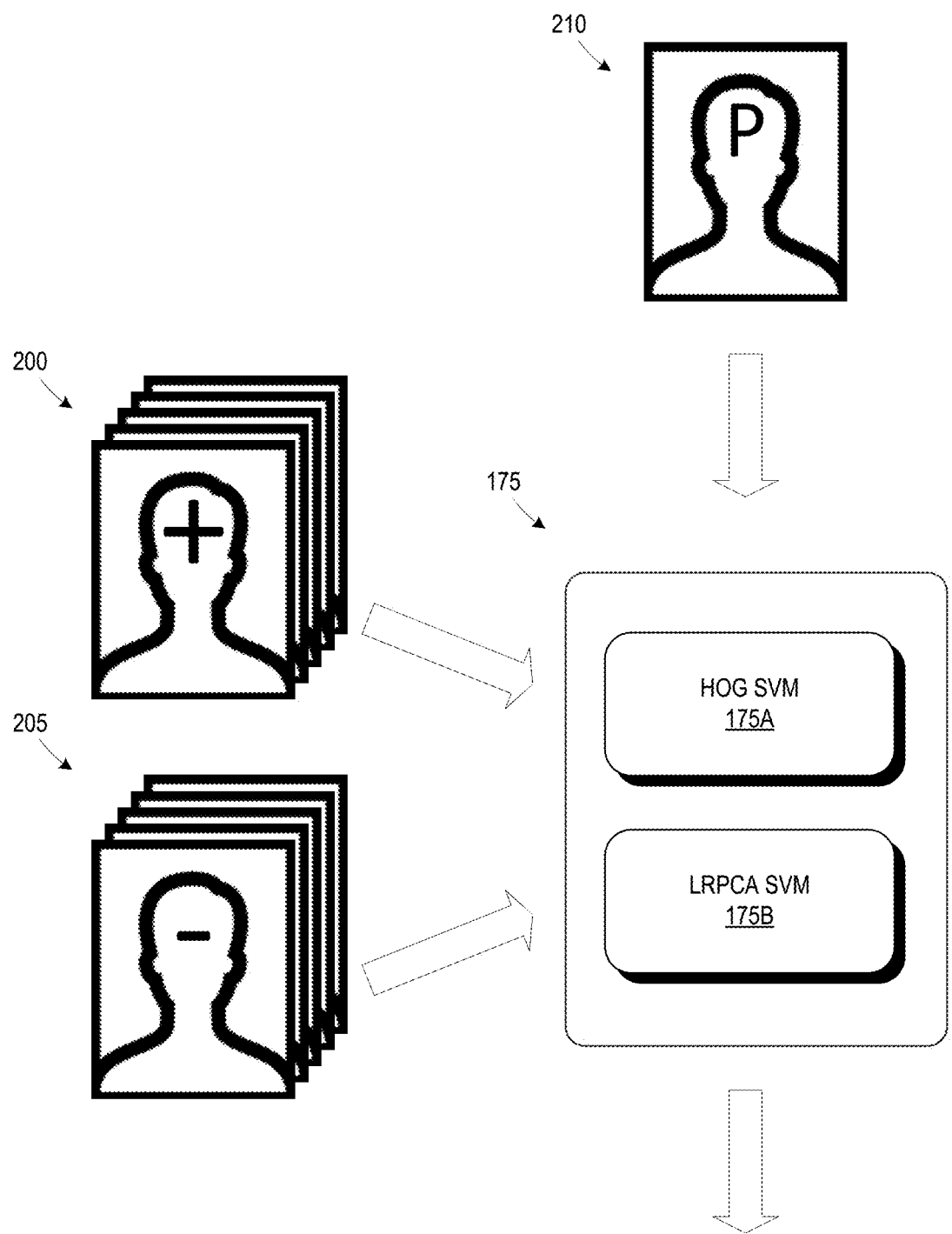
FIG. 2 is a diagram illustrating a first-tier classifier, according to some embodiments.

FIG. 2 is a diagram illustrating the first-tier classifier 175, according to some embodiments. The first-tier classifier 175 employs a positive gallery 200 collected for the user during the enrollment mode, and a negative gallery 205 collected for individuals other than the user. Although the galleries are illustrated as being images in FIG. 2, the galleries 200, 205 may be sets of characteristic vectors extracted from the positive and negative images. The user need only generate the positive gallery 200 during enrollment, the negative gallery 205 may be preloaded on the mobile device 100 or loaded from a remote service provider during enrollment.

During enrollment, n self-portraits are acquired from the device owner using the camera 150. The self-portraits may be acquired in different views, i.e., similar photos with small variations in head pose, facial expression and illumination conditions. For each image, the location of the eyes' center is determined, which are used for normalization purposes. Each enrollment image is cropped and aligned so that the eyes are fixed on standard pixel locations, i.e., the distance of the center of the eyes to the image boundaries is the same for all enrollment images. The aligned face images are converted to grayscale. All images are scaled to 128×128. Features of these images are extracted to generate the characteristic vectors in the positive gallery 200 and used to train the classifier along with the characteristics represented in the negative gallery 205.

During the enrollment process, two linear Support Vector Machine (SVM) classifiers 175A, 175B are separately trained on HOG and LRPCA features, respectively. In some embodiments, for the LRPCA SVM 175B, PCA subspaces are constructed for only two 36×36 regions centered around each eye and a region comprising the whole face image, retaining 92% of the variance of the training data. The projections over these three subspaces are concatenated into a feature vector of size 192. For the HOG SVM 175A, 16×16 cells and 32×32 blocks with stride of 16 are considered, resulting in 1,764-sized vectors. In general, HOG and LRPCA are relatively fast to compute and provide vectors with low dimensionality, meaning they can be stored in the memory 120 without great impact. The training of the SVM classifiers 175A, 175B may be performed after the enrollment in an offline manner—e.g., when the mobile device 100 is idle—to decrease usability impact.

During authentication, probe image data 210 is captured by the camera 150. Its features are extracted in the same manner as the features were extracted above in generating the galleries 200, 205. The probe image characteristics are applied to each of the SVM classifiers 175A, 175B to generate probability metrics, $prob^{HOG}$ and $prob^{PCA}$. The probabilities are averaged to generate a first-tier probability:

$$prob1 = \frac{prob^{HOG} + prob^{PCA}}{2}$$

The SVM classifiers 175A, 175B provide a fast, high true positive rate classification. As will be described in greater detail below, the first-tier probability, $prob_1$, is used to provide a screening mechanism. If the confidence of the recognition generated by the first-tier classifier 175 is high (e.g., $prob_1 > T_H$), no further authentication need be performed, and the authentication request can be approved. If the confidence of the recognition generated by the first-tier classifier 175 is low (e.g., $prob_1 < T_L$), no further authentication need be performed, and the authentication request can be denied. The second-tier classifier 180 aims to reduce false negatives that are missed by the first-tier classifier 175.

Figure 3:
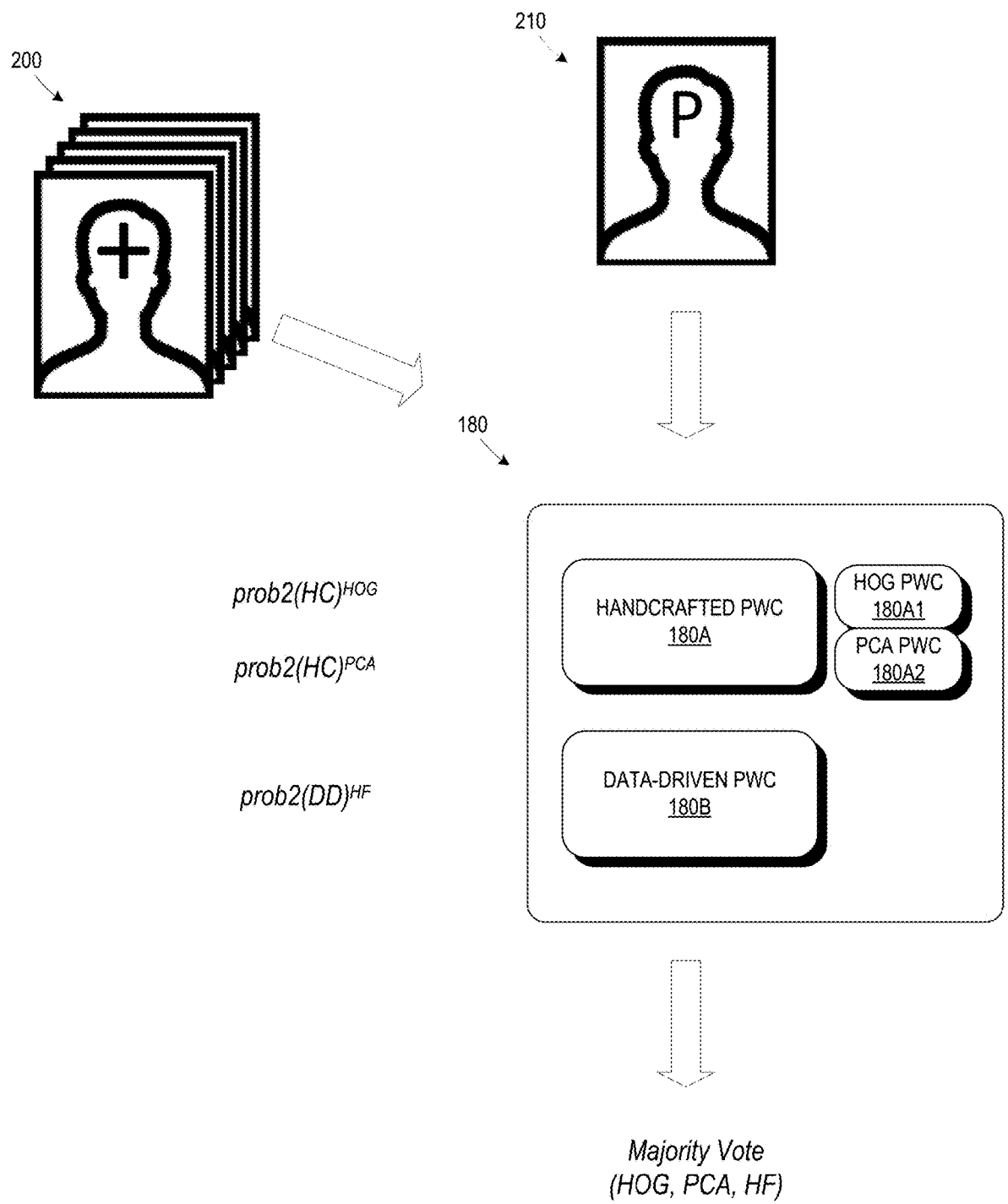
FIG. 3 is a diagram illustrating a second-tier classifier, according to some embodiments.

FIG. 3 is a diagram illustrating the second-tier classifier 180, according to some embodiments. The second-tier classifier 180 is a pairwise classifier, which generates a probability that two images are of the same individual. The second-tier classifier 180 captures complimentary characteristics that improve the overall accuracy when combined with the first-tier classifier 175. The pairwise technique may be trained offline without the positive gallery 200, allowing a more complex and powerful model. In some embodiments, the second-tier classifier 180 includes a handcrafted characteristic pairwise classifier (PWC) 180A and a data-driven pairwise classifier (PWC) 180B.

The handcrafted PWC 180A employs a multi-view technique that compares the probe image data 210 (i.e., the characteristics extracted from the actual image) to each of the entries in the positive gallery 200. The handcrafted PWC 180A builds pairs of images including the probe image data 210, p, and each entry in the probe gallery 200, $g_i \in$. In the illustrated embodiment, both the HOG and the PCA image characteristics are employed, resulting in the handcrafted PWC 180A having a HOG PWC 180A1 and a PCA PWC 180A2.

To construct a feature vector, $F_{pair}(a, b)$, for a pair of face images a and b, feature vectors $F(a)$ and $F(b)$ are first extracted for each image of the pair. Then, the modulus of the difference and element-wise product of $F(a)$ and $F(b)$ are concatenated:

$$F_{pair}(a,b)=[|F(a)-F(b)|, F(a) \circ F(b)].$$

During training, a dataset of face images, D, was used to compute a set of pair feature vectors, $S_{train} = \{F_{pair}(x, y) | x, y \in D, x \neq y\}$. If images x and b depict the same person, then $F_{pair}(x, y)$ is labeled as positive, and negative otherwise. The $S_{train}$ of the pair of feature vectors was used as an input to a Logistic Regression classifier (LogReg), to train a model able to make a prediction as to the probability of the input being positive. The process was conducted for both a HOG component and a PCA component.

During authentication, $F_{pair}(p, g_i)$ is computed between the probe p and each gallery image, $g_i \in G$, i=1, . . . , n. Each pair feature vector is tested against the LogReg model, outputting a probability $prob_{g_i}$ of the respective pair of images p and $g_i$ depicting the same person. The final multiview probability is generated for each of the HOG and PCA pairwise classifier components:

$$prob(HC)^{HOG/PCA} = \frac{1}{n}\sum_{i=1}^{n} prob_{g_i}.$$

The handcrafted PWC probabilities are evaluated individually.

Figure 4:
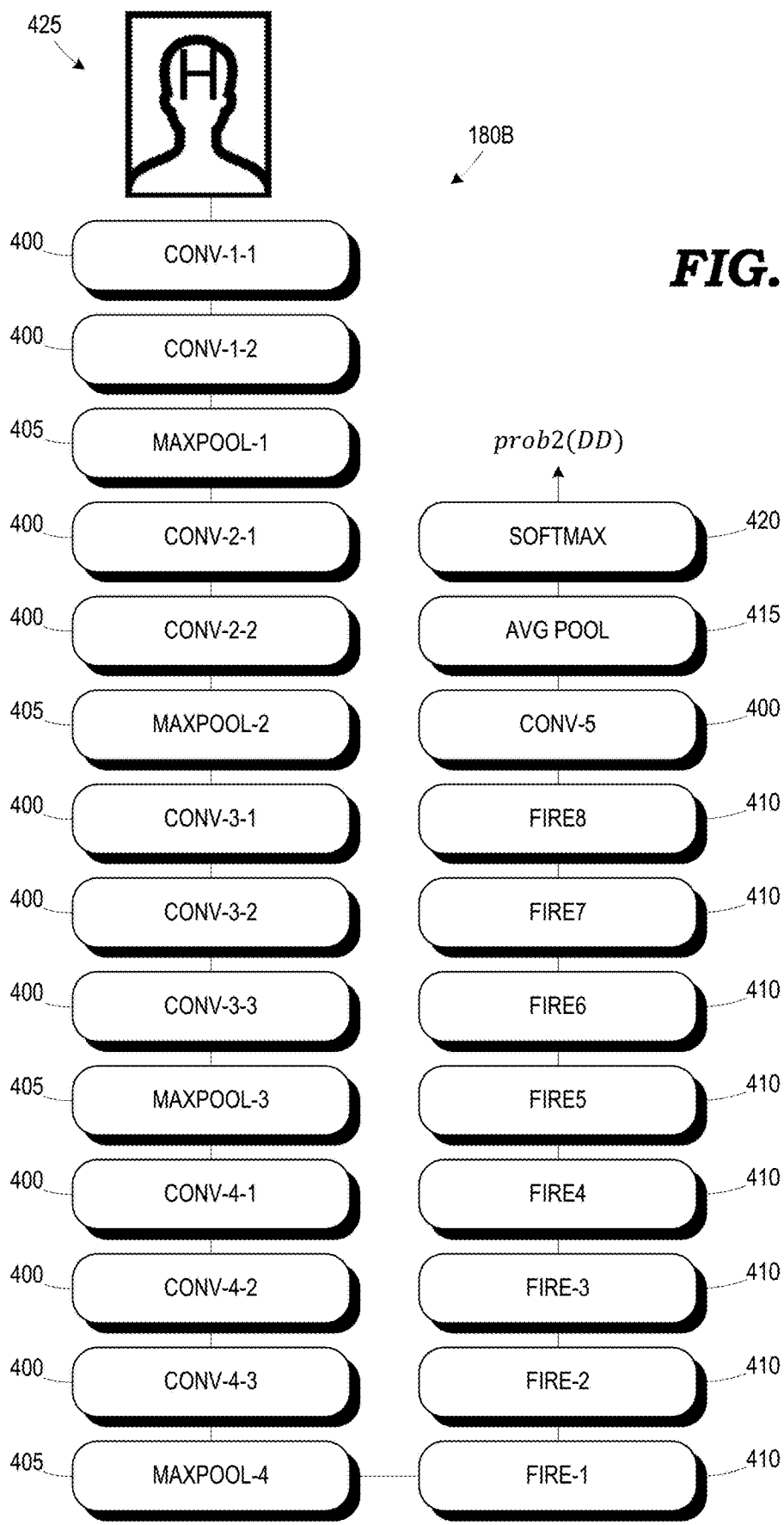
FIG. 4 is a diagram illustrating a data-driven pairwise classifier employing a convolutional neural network (CNN) architecture, according to some embodiments.

The data-driven pairwise classifier (PWC) 180B employs a convolutional neural network (CNN) classifier having the architecture illustrated in FIG. 4. The data-driven pairwise classifier (PWC) 180B employs a hybrid approach, referred to as a Hybrid-Fire CNN (HF-CNN) architecture. The HF-CNN architecture was developed with the goal of classifying if two face images belong or not to the same identity. The data-driven pairwise classifier (PWC) 180B implementing the HF-CNN architecture includes a sequence of 10 convolutional layers 400 (denoted individually as conv-m-n). Each convolutional layer 400 applies to its input a bank of linear filters (linear convolution) which are optimized during training with regards to a classification loss function. Each convolutional layer 400 learns more complex concepts on top of the output of the previous convolutional layer 400. The output of each convolutional layer 400 includes a rectifier linear unit (ReLU). Max pooling layers 405 (max-pool-i) are provided after the second (conv-1-2), fourth (conv-2-2), seventh (conv-3-3), and tenth (conv-4-3) convolutional layers 400. While ReLU adds non-linearity to the network, max pooling helps to make the representation invariant to small translations of the input.

The output maps of the last max pooling layer 405 (maxpool-4) are fed to a sequence of 8 Fire module layers 410 (fire-j). Each Fire module layer 410 includes two steps (Squeeze and Expand). In the Squeeze stage, the input is processed by a convolutional layer with filter sizes of 1×1. These 1×1 convolutions act as a bottleneck, decreasing the number of input channels while also condensing relevant input information and discarding redundancy therein. The Expand stage processes the output from the Squeeze stage with convolutions with filter sizes of 1×1 and 3×3. By stacking Fire modules 410, the network increases in depth, being able to learn more complex concepts and generalize better with a reduced number of parameters (i.e., which is directly related to the model size).

A convolutional layer 400 (conv-5) maps the output of the last Fire module 410 (fire-8) to two confidence maps (one for each of the target classes). A global average pooling layer 415 (avg pool) is applied to average the activations of each map separately and a softmax layer 420 computes the class posterior probabilities. These last operations (conv-5 and global average pooling) have stacked fully connected layers in which every output node is connected to every input signal and map the output of the convolutions to the posterior probabilities.

The input to HF-CNN network is a hybrid image 425 of size 112×112. The relatively small input size provides computational efficiency for the network. A hybrid image 425 is a 3-channel image, whose first channel corresponds to the grayscale probe image data 210 (the image whose identity is being authenticated) and the second channel is the average grayscale image of the gallery 200 (a pre-enrolled group of images from a single trusted identity that is being tested against). In some embodiments, the third channel may be empty (filled with zeros), or alternatively, not used at all.

The output of the HF-CNN network is the $2^{nd}$ tier probability, $prob2(DD)^{HF}$, that the probe image matches the image represented by the average gallery image.

Figure 5:
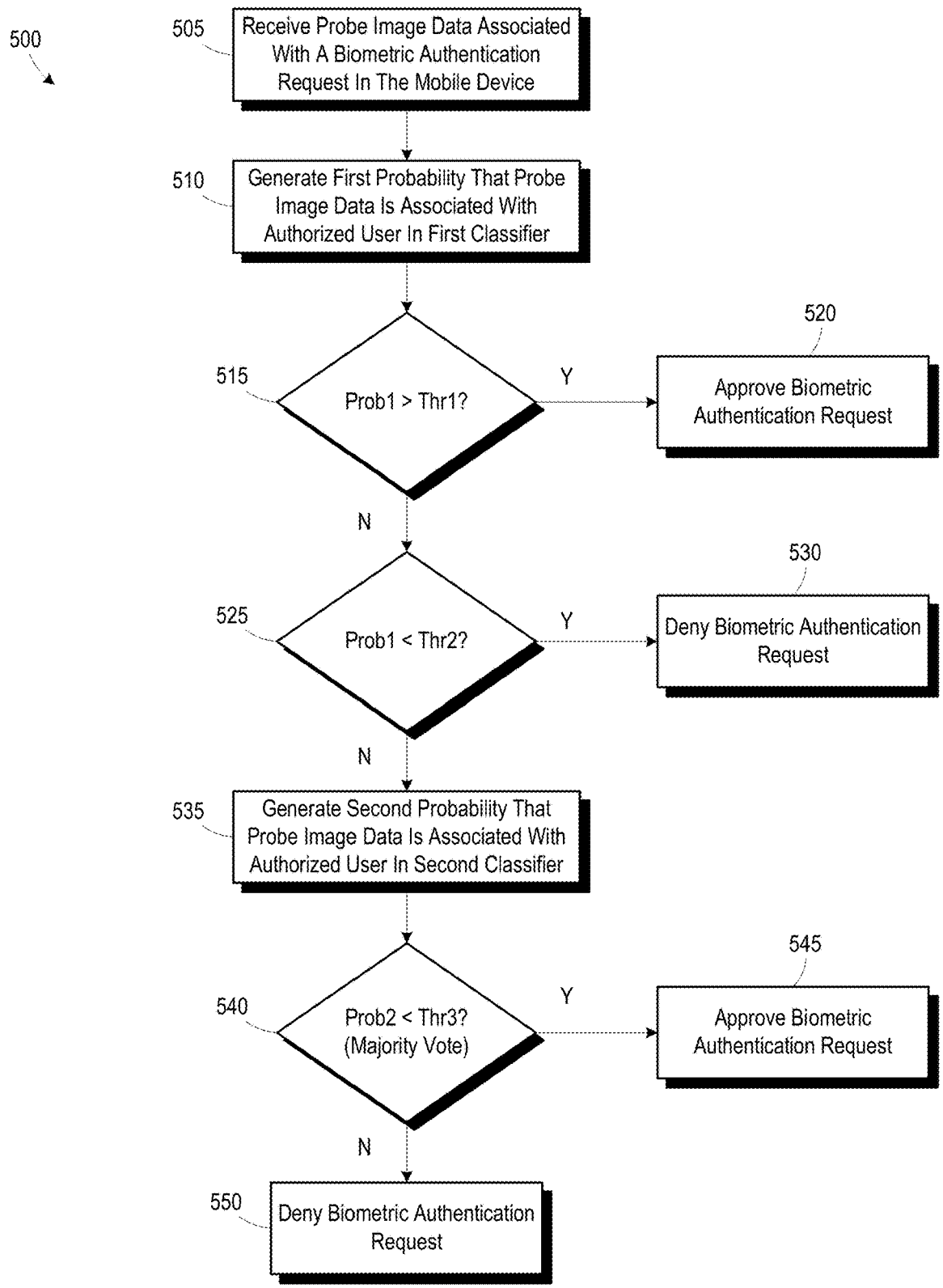
FIG. 5 is a flow diagram of an illustrative method for performing a multiple-tiered facial recognition technique, according to some embodiments.

FIG. 5 is a flow diagram of an illustrative method 500 for performing a multiple-tiered facial recognition technique, according to some embodiments. In method block 505, probe image data 210 associated with a biometric authentication request is received in the mobile device 100. Probe image data 210 may be captured by the camera 150 in response to an identity verification request. For example, the identity verification request may be generated based on the user trying to unlock the mobile device 100, to open a particular app on the mobile device 100, or to conduct a transaction (e.g., banking, purchasing, etc.) on the mobile device 100. In some embodiments, the probe image data 210 may be represented by a set of characteristic data extracted from a probe image captured by the camera 150.

In method block 510, a first classifier 175 is employed to generate a first probability metric of the probe image data being associated with an authorized user. The first classifier is trained using a first library 200 of authorized user images (i.e., positive gallery) and a second library 205 of non-user images (i.e., negative gallery). The actual images in the libraries 200, 205 may be represented by sets of characteristic data extracted from the respective images. The first classifier 175 may include multiple components, such as the HOG SVM 175A and the LRPCA SVM 175B described above, and the probabilities of the components may be averaged.

The first probability metric is compared to a first threshold (Thr1-true positive) in method block 515. If the first probability metric is greater than the first threshold (i.e., high positive confidence) in method block 515, the biometric authentication request is approved in method block 520.

The first probability metric is compared to a second threshold (Thr2-true negative) in method block 525. If the first probability metric is less than the second threshold (i.e., high negative confidence) in method block 525, the biometric authentication request is denied in method block 530.

If the first probability metric lies between the first and second thresholds, a high confidence decision cannot yet be made.

In method block 535, a second classifier 180 is employed to generate a second probability metric of the probe image data being associated with an authorized user. The second classifier 180 include multiple components, such as the handcrafted characteristic pairwise classifier (PWC) 180A and a data-driven pairwise classifier (PWC) 180B.

In method block 540, the second probability metric is compared to a third threshold (Thr3). If the second probability metric is greater than the third threshold in method block 540, the biometric authentication request is approved in method block 545. Otherwise, the biometric authentication request is denied in method block 550. In some embodiments, the threshold analysis in method block 540 may individually compare each probability output of the second classifier 180 (e.g., $prob2(HC)^{HOG}$, $prob2(HC)^{PCA}$, $prob2(DD)^{HF}$) to the third threshold and generate a positive or negative outcome based on a majority vote (e.g., ⅔). Each component of the classifier 180 may have its own unique value for the third threshold (i.e., $Thr3^{HOG}$, $Thr3^{PCA}$, $Thr3^{HF}$). In some embodiments, only one handcrafted characteristic pairwise classifier (PWC) 180A may be used, and the handcrafted probability may be averaged with the data-driven probability to generate the second tier probability (as opposed to a voting technique).

In general, determining the first-tier thresholds involves balancing the trade-off between true positive rate (TPR) and true negative rate (TNR). A lower threshold increases the number of authenticated attempts, increasing the TPR at the cost of lowering the TNR, and increasing the likelihood of allowing access to intruders. On the other hand, a higher threshold is more rigorous on which probe images will be authenticated. Consequently, TPR decreases and reduces the probability of an intruder gaining access to the device 100, i.e., higher TNR.

In some embodiments, the thresholds, $Thr3^{XXX}$, employed by the second-tier classifier 180 may be determined dynamically. The third-tier thresholds are determined by considering the final accuracy (or F-measure). The $2^{nd}$ tier thresholds are adapted to better differentiate the owner's unique characteristics. A threshold learning approach automatically chooses the individual acceptance threshold of the $2^{nd}$ tier classifiers 180A1, 180A2, 180B using images from the galleries 200, 205, balancing both desired TPR and TNR. The threshold learning may be performed by the mobile device 100 in an offline manner, i.e., when the device 100 is idle.

Given the positive gallery 200 (G) and the negative gallery 205 (O), and for each classifier 180A1, 180A2, 180B of the $2^{nd}$ tier:

For each $g_i \in G$, construct n sets $S_{i,j}$ using 1 randomly sampled images from $G-\{g_i\}$, with $1 < n$, $j \in [1, n]$;

Construct positive tuple set P, considering all sets $S_{i,j}$:

$$P=\{(g_1,S_{1,1}),\ldots,(g_i,S_{1,n}),\ldots,(g_n,S_{n,n})\};$$

Construct n sets $S_i$, where $S_i$ consists of all images from $G-\{g_i\}$, for $i \in [1, n]$;

Construct negative tuple set N, considering all sets $S_i$:

$$N=\{(o_1,S_1),\ldots,(o_1,S_n),\ldots,(o_n,S_n)\};$$

Input each tuple P and N into respective classifier 180A1, 180A2, 180B and register its probability;

For all registered probabilities, a threshold, $Thr3^{HOG}$, $Thr3^{PCA}$, $Thr3^{HF}$, is chosen that maximizes a desired metric (e.g., accuracy or F-score) for the associated classifier 180A1, 180A2, 180B. The thresholds may be updated dynamically as additional images are added to the libraries 200, 205. For example, probe images 210 that exceed the high threshold, Thr1, may be added to the positive gallery 200.

The first-tier classifier 175 provides a screening technique high that allows aggressive true positive (Thr1) and true negative (Thr2) thresholds to be employed for a fast authentication decision. For authentications that fall outside the screening thresholds, a more robust approach may be employed using the second-tier classifiers 180A, 180B to achieve a balanced TPR and TNR.

In some embodiments, certain aspects of the techniques described above may be implemented by one or more processors of a processing system executing software. The classifiers 175, 180 and method 500 described herein may be implemented by executing software on a computing device, such as the processor 115 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving probe image data associated with a biometric authentication request on a mobile device. A first classifier is employed to generate a first probability metric of the probe image data being associated with the authorized user. The biometric authentication request is approved responsive to the first probability metric being greater than a first threshold. The biometric authentication request is denied responsive to the first probability metric being less than a second threshold. Responsive to the probability metric being between the first and second thresholds, a second classifier is employed to generate a second probability metric of the probe image data being associated with the authorized user. The biometric authentication request is approved responsive to the second probability metric being greater than a third threshold.

A device includes a camera to generate probe image data associated with a biometric authentication request and a processor coupled to the camera. The processor is to employ a first classifier to generate a first probability metric of the probe image data being associated with the authorized user, approve the biometric authentication request responsive to the first probability metric being greater than a first threshold, deny the biometric authentication request responsive to the first probability metric being less than a second threshold, responsive to the probability metric being between the first and second thresholds, employ a second classifier to generate a second probability metric of the probe image data being associated with the authorized user, and approve the biometric authentication request responsive to the second probability metric being greater than a third threshold.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    receiving probe image data associated with a biometric authentication request on a mobile device;
    employing a first classifier to generate a first probability metric of the probe image data being associated with the authorized user;
    approving the biometric authentication request responsive to the first probability metric being greater than a first threshold;
    denying the biometric authentication request responsive to the first probability metric being less than a second threshold;

responsive to the first probability metric being between the first and second thresholds, employing a second classifier to generate a second probability metric of the probe image data being associated with the authorized user; and approving the biometric authentication request responsive to the second probability metric being greater than a third threshold.

2. The method of claim 1, wherein the probe image data comprises a probe set of characteristic data.

3. The method of claim 2, wherein the first classifier is trained using a first library of user sets of characteristic data associated with an authorized user of the mobile device and a second library of non-user characteristic sets not associated with the authorized user to generate the first probability metric.

4. The method of claim 2, wherein the first classifier comprises a support vector machine.

5. The method of claim 1, wherein the second classifier comprises a first pairwise component that compares the probe image data to each entry in a first library of user sets of characteristic data associated with an authorized user of the mobile device to generate a first component of the second probability metric, wherein the first pairwise component employs a first characteristic feature set.

6. The method of claim 5, wherein the second classifier comprises a second pairwise component that compares the probe image data to each entry in the first library to generate a second component of the second probability metric, wherein the second pairwise component employs a second characteristic feature set different than the first characteristic feature set.

7. The method of claim 6, wherein the second classifier comprises a third pairwise component that employs a convolutional neural network to compare the probe image data to an average set of image data generated by averaging entries in the first library to generate a third component of the second probability metric.

8. The method of claim 7, wherein the second classifier employs a majority voting technique using the first, second, and third components of the second probability metric.

9. The method of claim 8, wherein each of the first, second, and third components of the second probability metric has an individual value of the third threshold.

10. The method of claim 9, further comprising generating the individual values of the third threshold using the first library and a second library of non-user characteristic sets not associated with the authorized user.

11. A device, comprising:
a camera to generate probe image data associated with a biometric authentication request; and
a processor coupled to the camera to employ a first classifier to generate a first probability metric of the probe image data being associated with the authorized user, approve the biometric authentication request responsive to the first probability metric being greater than a first threshold, deny the biometric authentication request responsive to the first probability metric being less than a second threshold, responsive to the first probability metric being between the first and second thresholds, employ a second classifier to generate a second probability metric of the probe image data being associated with the authorized user, and approve the biometric authentication request responsive to the second probability metric being greater than a third threshold.

12. The device of claim 11, wherein the probe image data comprises a probe set of characteristic data.

13. The device of claim 12, wherein the first classifier is trained using a first library of user sets of characteristic data associated with an authorized user of the mobile device and a second library of non-user characteristic sets not associated with the authorized user to generate the first probability metric.

14. The device of claim 12, wherein the first classifier comprises a support vector machine.

15. The device of claim 11, wherein the second classifier comprises a first pairwise component that compares the probe image data to each entry in a first library of user sets of characteristic data associated with an authorized user of the mobile device to generate a first component of the second probability metric, wherein the first pairwise component employs a first characteristic feature set.

16. The device of claim 15, wherein the second classifier comprises a second pairwise component that compares the probe image data to each entry in the first library to generate a second component of the second probability metric, wherein the second pairwise component employs a second characteristic feature set different than the first characteristic feature set.

17. The device of claim 16, wherein the second classifier comprises a third pairwise component that employs a convolutional neural network to compare the probe image data to an average set of image data generated by averaging entries in the first library to generate a third component of the second probability metric.

18. The device of claim 17, wherein the second classifier employs a majority voting technique using the first, second, and third components of the second probability metric.

19. The device of claim 18, wherein each of the first, second, and third components of the second probability metric has an individual value of the third threshold.

20. The device of claim 19, wherein the processor is to generate the individual values of the third threshold using the first library and a second library of non-user characteristic sets not associated with the authorized user.

* * * * *

UNITED STATES PATENT AND TRADEMARK OFFICE
CERTIFICATE OF CORRECTION

PATENT NO. : 10,733,279 B2
APPLICATION NO. : 15/918462
DATED : August 4, 2020
INVENTOR(S) : Fernanda Alcantara Andalo et al.

Page 1 of 1

It is certified that error appears in the above-identified patent and that said Letters Patent is hereby corrected as shown below:

On the Title Page

In item (72) the "INVENTORS:" Section, replace:
"Fernanda Alcantara Andalo, Campinas (BR); Rafael Soares Padilha, Sao Paulo (BR); Waldir Rodrigues de Almeida, Campinas (BR); Gabriel Capiteli Bertocco, Campinas (BR); Jacques Wainer, Campinas (BR); Ricardo da Sliva Torres, Campinas (BR); Anderson de Rezende Rocha, Campinas (BR)"

With:
-- Fernanda Alcantara Andalo, Campinas (BR); Rafael Soares Padilha, Sao Paulo (BR); Waldir Rodrigues de Almeida, Campinas (BR); Gabriel Capiteli Bertocco, Campinas (BR); Jacques Wainer, Campinas (BR); Ricardo da Sliva Torres, Campinas (BR); Anderson de Rezende Rocha, Campinas (BR); William Marques Dias, Campinas (BR); Thiago Resek Rabri do Anjos, Campinas (BR) --.

Signed and Sealed this
Sixteenth Day of December, 2025

John A. Squires
*Director of the United States Patent and Trademark Office*